(12) United States Patent
Cossairt et al.

(10) Patent No.: US 7,864,419 B2
(45) Date of Patent: Jan. 4, 2011

(54) OPTICAL SCANNING ASSEMBLY

(75) Inventors: Oliver S. Cossairt, Cambridge, MA (US); Michael Thomas, Belmont, MA (US); Rick K. Dorval, Manchester, NH (US)

(73) Assignee: Ellis Amalgamated LLC, Arlington, MA (US)

( * ) Notice: Subject to any disclaimer, the term of this patent is extended or adjusted under 35 U.S.C. 154(b) by 1276 days.

(21) Appl. No.: 11/146,749

(22) Filed: Jun. 7, 2005

(65) Prior Publication Data
US 2005/0270645 A1 Dec. 8, 2005

Related U.S. Application Data

(60) Provisional application No. 60/578,125, filed on Jun. 8, 2004, provisional application No. 60/675,165, filed on Apr. 27, 2005.

(51) Int. Cl.
G03B 21/56 (2006.01)
G03B 21/60 (2006.01)

(52) U.S. Cl. .................. 359/446; 359/458; 359/463

(58) Field of Classification Search ............ 359/458, 359/446, 463, 622; 353/7
See application file for complete search history.

(56) References Cited

U.S. PATENT DOCUMENTS 2,012,995 A * 9/1935 Ives .......................... 352/57
3,125,927 A * 3/1964 Erban ....................... 359/446
3,881,810 A 5/1975 Colao ....................... 350/285
4,317,618 A * 3/1982 Murakoshi ................ 359/446
4,390,239 A * 6/1983 Huber ....................... 359/446
4,456,783 A * 6/1984 Baker ....................... 136/246
4,468,115 A * 8/1984 Lao .......................... 355/22
5,465,175 A 11/1995 Woodgate et al.
5,930,037 A * 7/1999 Imai ......................... 359/463
6,008,484 A * 12/1999 Woodgate et al. ......... 250/201.1
6,061,179 A * 5/2000 Inoguchi et al. ........... 359/622
6,061,489 A * 5/2000 Ezra et al. ................. 385/115
6,377,295 B1 * 4/2002 Woodgate et al. ......... 359/463
6,487,020 B1 * 11/2002 Favalora .................... 359/619
7,277,226 B2 * 10/2007 Cossairt et al. ............ 359/446
2005/0146787 A1 7/2005 Lukyanitsa

OTHER PUBLICATIONS

B. Lee, S. Min and B. Javidi, "Theoretical analysis for three-dimentional integral imaging systems with double devices", pp. 4856-4865, Aug. 2002.
M. Kawazu and Y. Ogura, "Application of gradient-index fiber arrays to copying machines", pp. 1105-1112, Apr. 1980.
V. Shaoulov and J. P. Rolland, "Design and assessment of microlenslet-array relay optics", pp. 6836-6845, Dec. 2003.
R. H. Anderson, "Close-up imaging of documents and displays with lens arrays", pp. 477-484, Feb. 1979.
V. Shaoulov, R. Martins and J. P. Rolland, "Compact microlenslet-array-based magnifier", pp. 709-711, Apr. 2004.

(Continued)

Primary Examiner—Christopher Mahoney
(74) Attorney, Agent, or Firm—Cantor Colburn LLP

(57) ABSTRACT

An image scanning assembly comprising at least two optics wherein at least one of the optics is movable relative to the other. An embodiment may be used to scan images for a 3D display.

23 Claims, 18 Drawing Sheets

OTHER PUBLICATIONS

N. Davies, M. McCormick and L. Yang, "Three-dimensional imaging systems: a new development", pp. 4520-4528, Nov. 1988.

H. Hoshino, F. Okano, H. Isono and I. Yuyama, "Analysis of resolution limitation of integral photography", pp. 2059-2065, Aug. 1998.

Jesse B. Eichenlaub, "A Multiperspective Look Around Autostereoscopic Projection Display Using ICFLCD", Jan. 1999 pp. 110-121.

IBM Technical Disclosure Bulletin, "Autostereoscopic 3-D Image Display Device", Dec. 1, 1994, vol. 37, No. 12.

Akihito Nakai et al., "A Stereoscopic Display With a Vibrating Microlens Array", Oct. 20-24, 2002, pp. 524-527.

Siegmund Pastoor et al., An Experimental Multimedia System Allowing 3-D Visualization and Eye-Controlled Interaction Without User-Worn Devices, Mar. 1999, pp. 41-52.

M. Edward Motamedi et al., "Miniaturized Micro-Optical Scanners", Nov. 1, 1994, pp. 3616-3623.

Michael Halle, "Autostereoscopic Displays and Computer Graphics", May 1997, pp. 58-62.

Edward A. Watson, et al., "Implementing Optical Phased Array Beam Steering With Cascaded Microlens Arrays", Mar. 2002, pp. 1429-1436.

Edward A. Watson, "Analysis of Beam Steering with Decentered Microlens Arrays", Nov. 1993, pp. 2665-2670.

PCT International Search Report dated Nov. 8, 2005.

* cited by examiner

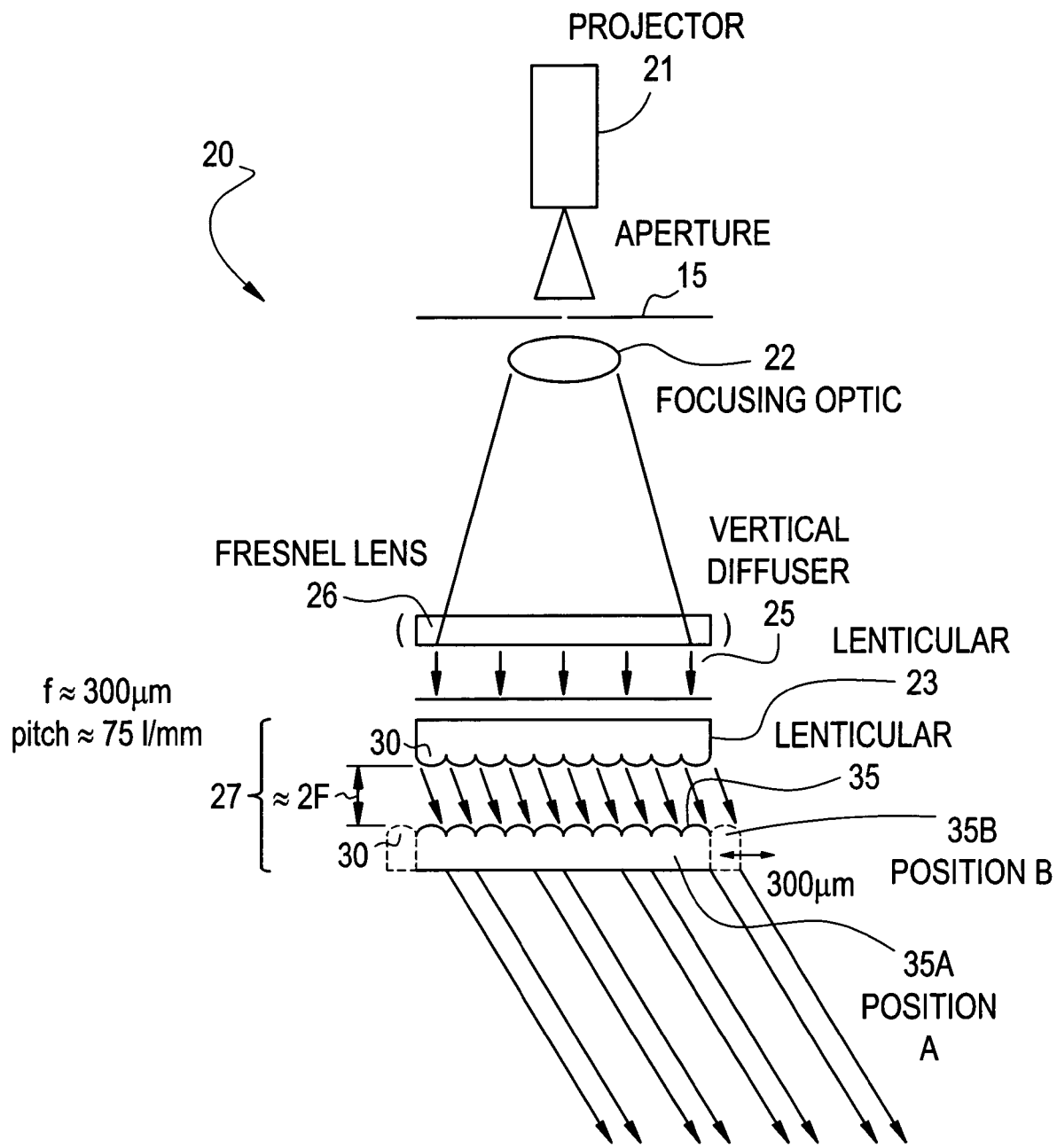

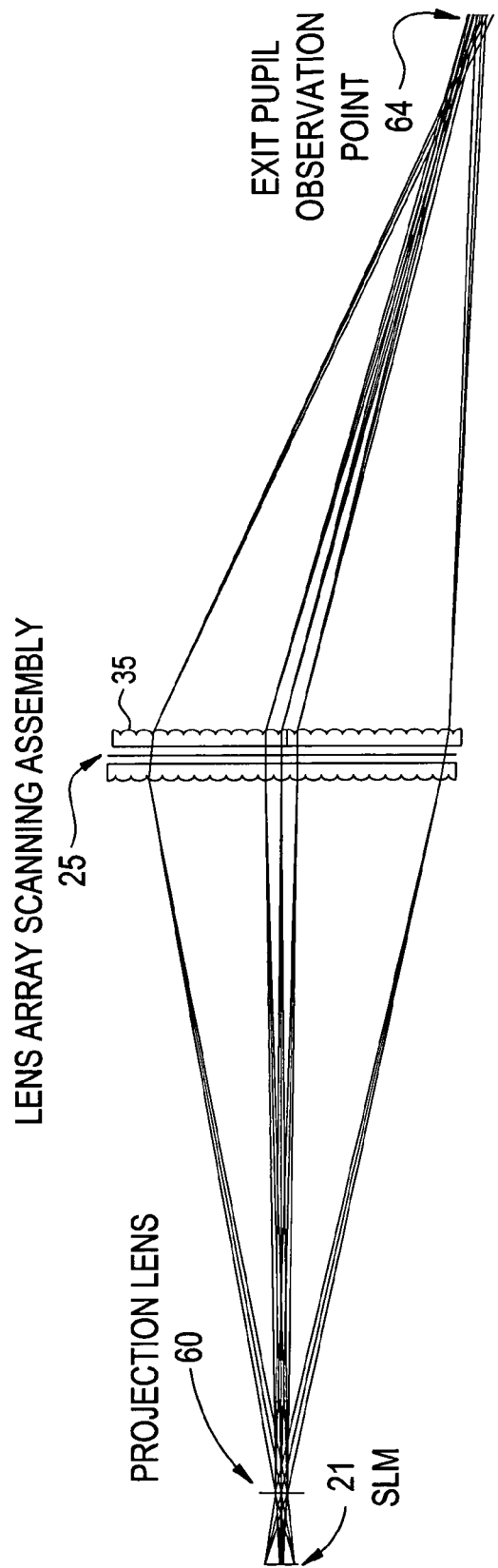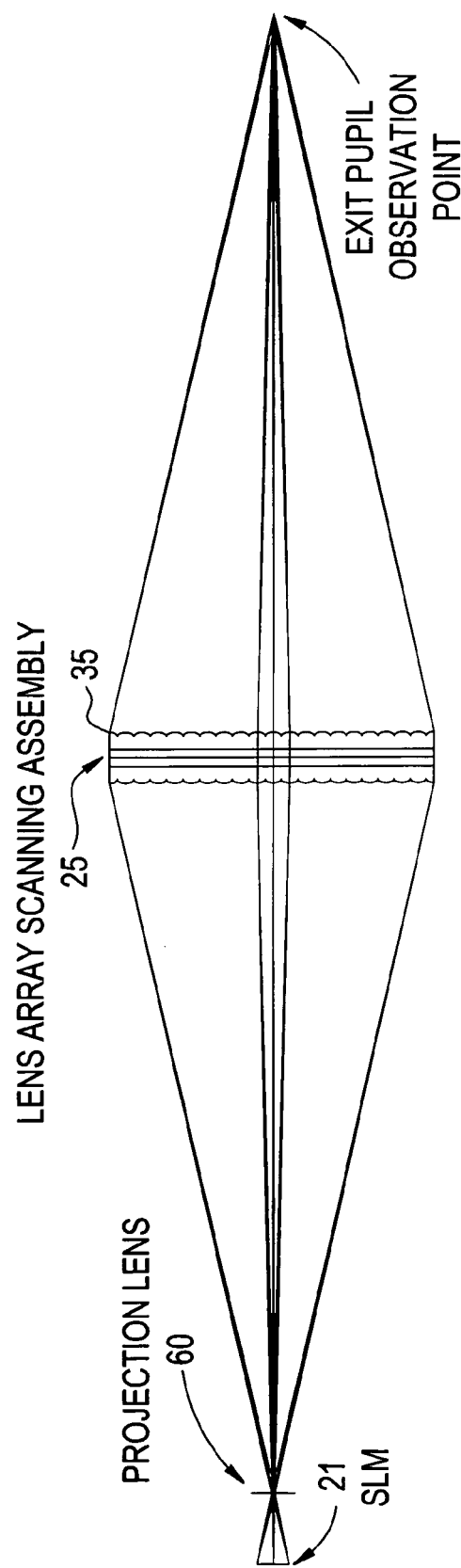

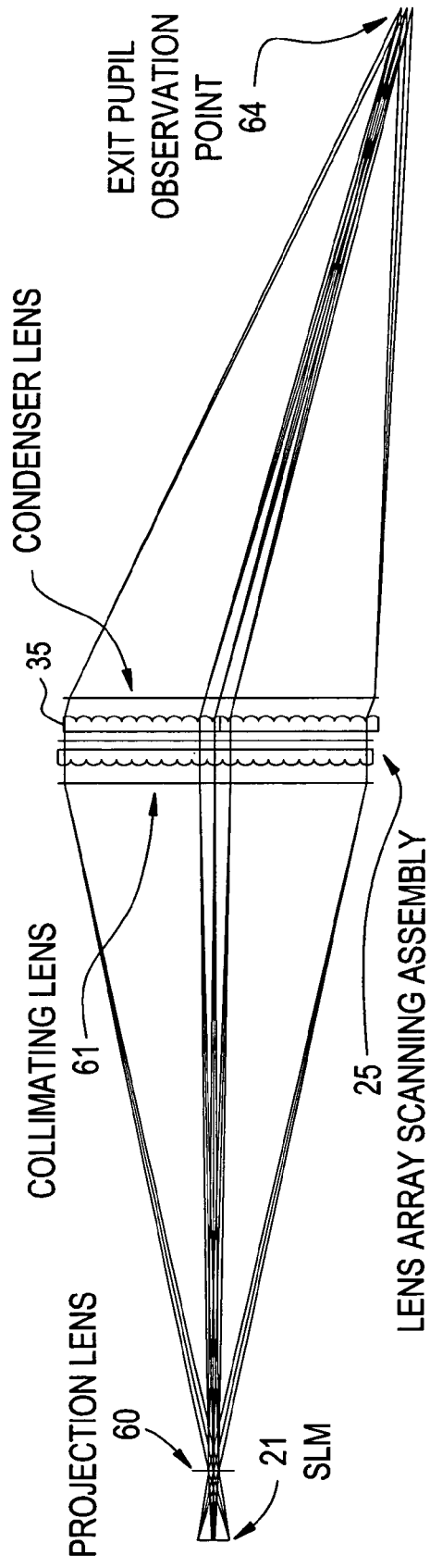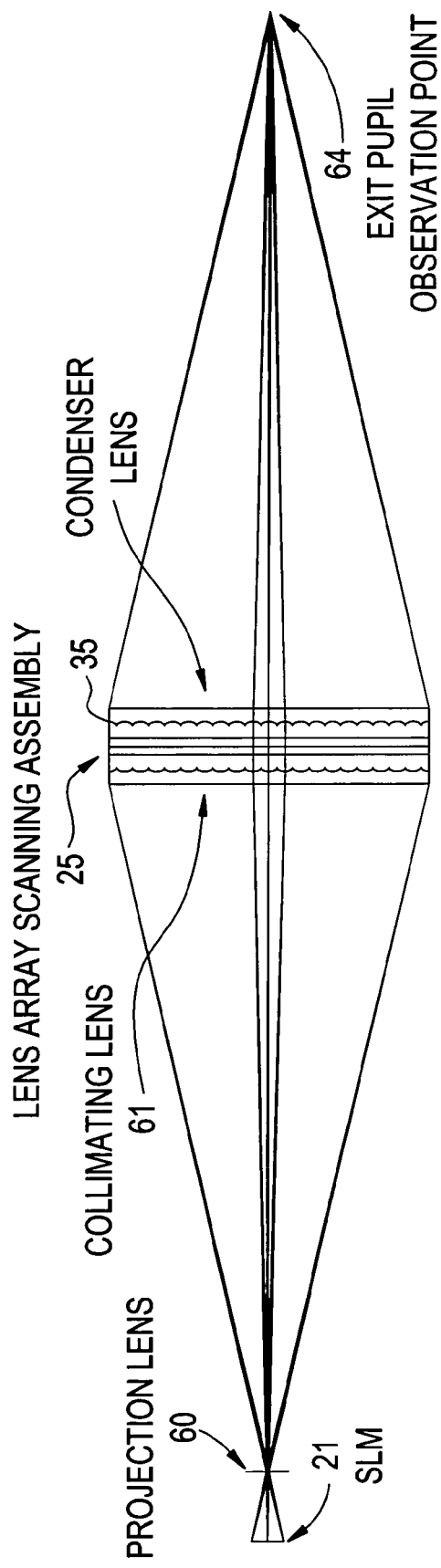

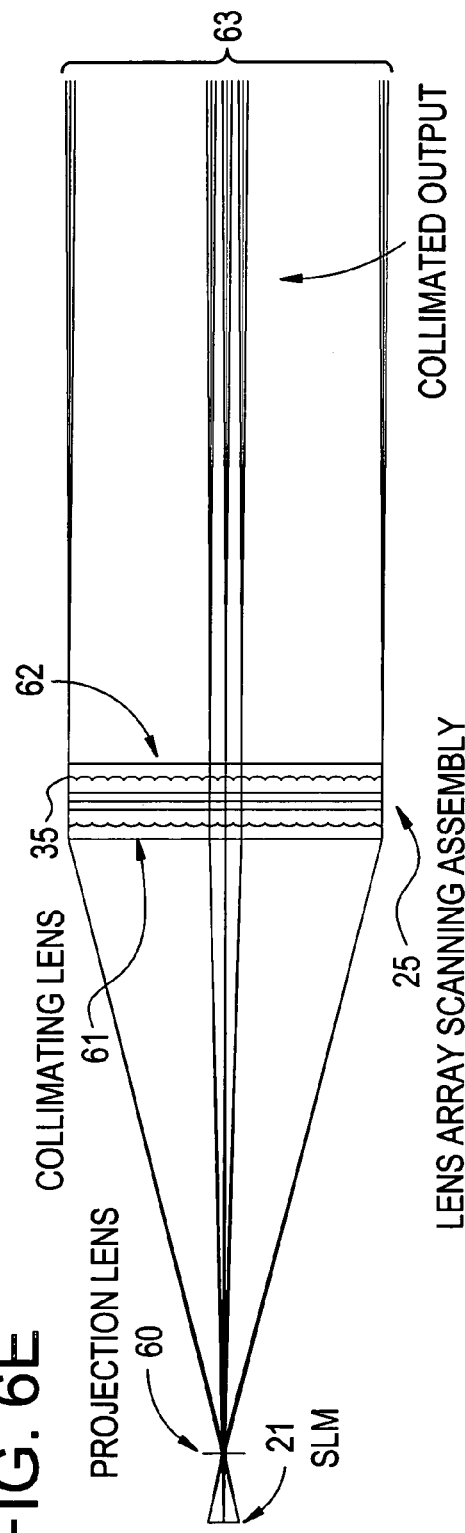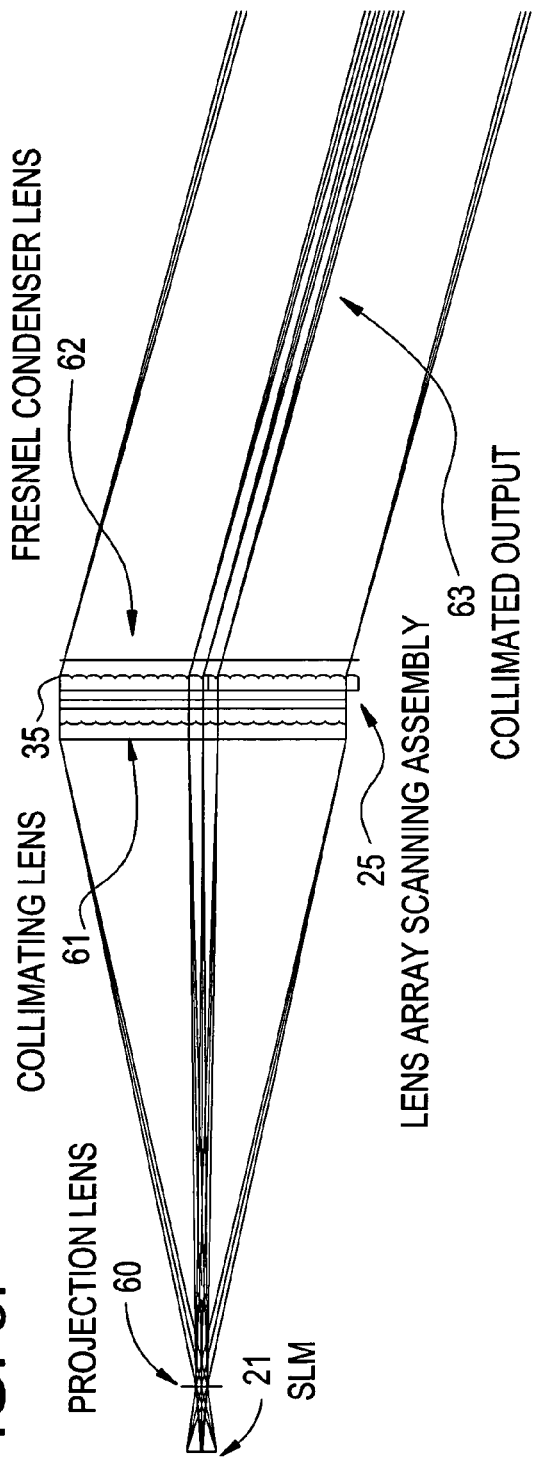

OPTICAL SCANNING ASSEMBLY

PRIORITY CLAIM

This application claims priority to U.S. provisional patent application No. 60/578,125 filed Jun. 8, 2004, the entire disclosure of which is hereby incorporated by reference. This application also claims priority to U.S. provisional patent application No. 60/675,165 filed Apr. 27, 2005, the entire disclosure of which is also hereby incorporated by reference.

STATEMENT REGARDING FEDERALLY SPONSORED RESEARCH

This invention was made with United States Government support under cooperative agreement number 70NANB3H3028 awarded by the National Institute of Standards and Technology (NIST). The United States Government has certain rights in the invention.

BACKGROUND 3D displays have taken many forms, such as parallax panoramagrams which use lenticular display elements ("lenticules") or parallax barriers to spatially demultiplex and steer light from an image surface to one or more viewing regions. Lenticules may be bi-convex, and may alternatively be long, thin lenses having a flat surface on one side and an opposing curved surface which forms a plano-convex lens. When viewed, the lenticule may provide a view angle-dependant striped or sliced portion of an image positioned behind each lenticule, i.e., the slice that is viewable is dependent upon the angle from which the viewer views the image. Therefore, arrays of lenticules can be used to create a parallax effect wherein different views or slices of total images are apparent from different viewing angles. In this way, a 3D effect can be achieved if the components of a 3D image are successfully rendered as separate slices, presented at the image surface as spatially multiplexed views, and are viewed through a lenticular array in a parallax manner.

The lenticular array concept has been used to create "no 3D glasses required" or "autostereoscopic" displays which uses a sheet array of lenticular lenses to steer interdigitated left, intermediate, and right eye views to a properly positioned observer.

Lenticular 3D displays techniques deserve their own category because they have earned a competitive place in the commercial market. However, the number of views they are capable of displaying is usually limited because they employ spatial multiplexing, whereby the resolution of the display is sacrificed to include parallax information. The minimum pixel size is consequently a limiting factor in these displays.

Interactive electronic flat panel 3D displays have been developed based on these techniques.

For example, StereoGraphics Corporation (San Rafael, Calif.) sells the SynthaGramm flat panel monitor series which is a lenticular-based 3D display. The SynthaGram series ranges from XGA (1024×768 pixel) to UXGA (3840×2400 pixel) monitors, and employs a custom fabricated diagonal lenticular screen which divides pixels into 9 different views. The monitor is driven by the DVI data output of a graphics card. The lenticular screen is designed to eliminate moire fringing, which can occur in lenticular flat panel screens, and divides pixels on the RGB level.

The drawback of existing lenticular 3D displays, and all spatially-multiplexed multi-view 3-D displays, is that by definition they trade off the projector's spatial resolution for the number of views displayed. The number of views is also limited by the shape of the lenticular elements and the pixel size. To date lenticular displays have produced at most 12 views.

Therefore, a 3D scanning system and or display which produces more views is needed.

It should be noted that references to the term "lenticular" should be interpreted to include other methods of using spatial multiplexing to encode two or more views of a 3-D scene into a single 2-D field of pixels. These "panoramagrams" or "parallax displays" can use many optical devices to perform demultiplexing, such as lenticular sheets, parallax barriers, fly's-eye lens arrays, or holographic optical elements. This invention employs lenticulars in a time-multiplexed rather than or in addition to a spatially-multiplexed manner as described below.

BRIEF SUMMARY OF THE INVENTION

Thus, an embodiment may comprise a 3D display apparatus comprising a projector for projecting images; an image scanning assembly for scanning and displaying the images comprising: a first optic; and a second optic; wherein at least one optic is structured to be displaceable in regard to the other optic in order to scan the images to selected viewpoints to create 3D imagery.

An embodiment may also comprise a 3D display apparatus comprising a projector for projecting view sequential images; an image scanning assembly for scanning and displaying the view sequential images to create a 3D display comprising: a first group of lenses; and a second group of lenses wherein at least one of the groups of lenses is structured to be displaceable in regard to the other group of lenses in order to scan the view sequential images to selected view points to create 3D view sequential imagery.

An embodiment may also comprise a method for 3D display comprising: projecting images from a projector; scanning and displaying the images via an image scanning assembly having at least a first optic and a second optic wherein the scanning and displaying comprises: sending the images through the first optic; sending the images through the second optic for display; and displacing at least one optic in regard to the other optic to scan the images to selected angular viewpoints to create 3D imagery.

An embodiment may also comprise a method for 3D display comprising projecting view sequential images from a projector; scanning and displaying the view sequential images via a refractive image scanning assembly having a first group of lenses and a second group of lenses wherein the scanning and displaying comprises: sending the view sequential images through the first group of lenses wherein refraction occurs which beam steers the view sequential images; sending the view sequential images through the second group of lenses wherein refraction occurs which further beam steers the view sequential images for display; and displacing at least one group of lenses in regard to the other group of lenses to refractively scan the view sequential images by beam steering the view sequential images to selected angular viewpoints to create 3D view sequential imagery.

An embodiment may also comprise a method for 3D display comprising: projecting images from a projector; scanning and displaying the images via an image scanning assembly wherein the scanning and displaying comprises: sending the images through a first optic; sending the images through an intermediary optical assembly; sending the images through a second optic; and displacing at least one optic in regard to the other optic in order to scan the images to selected viewpoints to create 3D imagery.

An embodiment may also comprise an image scanning assembly comprising an illumination source providing 2D patterned illumination; a first optic and a second optic, wherein at least one optic is structured to be displaceable in regard to the other optic in order to scan the patterned 2D illumination to selected positions.

An embodiment may also comprise an image scanning assembly comprising at least two optics at least one of which is an optic array wherein at least one of the optics is movable relative to the other.

BRIEF DESCRIPTION OF THE DRAWINGS

The following drawings should not be considered to limit the disclosure, the contemplated embodiments, or any equivalents. Referring to the exemplary drawings wherein like elements are numbered alike in the several Figures:

FIG. 4B is a top view on an embodiment.

FIGS. 6A-6B are ray diagrams of a lenticular scanning system screen in accordance with an embodiment without fresnel lenses.

FIGS. 6C-6D are ray diagrams of a lenticular scanning system screen in accordance with an embodiment with one fresnel lens.

FIGS. 6E-6F are ray diagrams of a lenticular scanning system screen in accordance with an embodiment with two fresnel lenses.

DETAILED DESCRIPTION

Disclosed herein are exemplary embodiments of an optical scanning system which for example provides a greater number of views in a multiview display system than is known. For example, in one embodiment 40 views are enabled. In another embodiment, up to 2000 views are enabled. However, more views are possible depending upon the hardware used.

The display and scanning concepts discussed herein may have uses in lithography, rapid prototyping, hologram printing, high resolution 2-D display, high-end visualization, medical imaging, oil & gas visualization, desktop computing, PDAs, cellphones, cockpit displays (cars, airplanes), boardroom or group presentation systems, video games, military visualization, homeland security, molecular modeling, trade shows, advertising, point of sale displays and many other uses for example. That is, the scanning concept discussed herein is a generalizable light-steering system, which has applications beyond electronic display.

It is well known to those skilled in the art that 3D displays require considerably greater bandwidth to their 2D counterparts. An ideal multiview display would include an equal amount of sampling in the viewing zone as in the image plane, requiring in excess of one trillion samples. Current data processing and transport techniques do not warrant such copious amounts of data to be managed at anywhere near real-time rates. One important optimization that 3D display designers have adopted is in implementing horizontal parallax only (HPO) displays. Such displays only sample the viewing region in the horizontal direction, which reduces the data requirements by as much as three orders of magnitude. This optimization has proven to be effective since the primary means that humans perceive motion parallax is along the horizontal axis. In practice, a billion pixels is still out of reach of current technology, so 3D displays are typically built with much lower view resolution than spatial resolution. Therefore, the 3D displays described herein may refer to HPO displays. However, the techniques described herein can be extended to full-parallax displays, typically by moving the beam steering optics in or along a 2-D rather than 1-D trajectory.

Figure 1A:
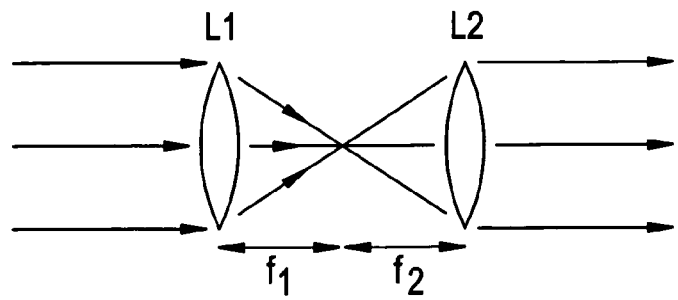
FIGS. 1A-1C depict a prior art lens arrangement.
Figure 1B:
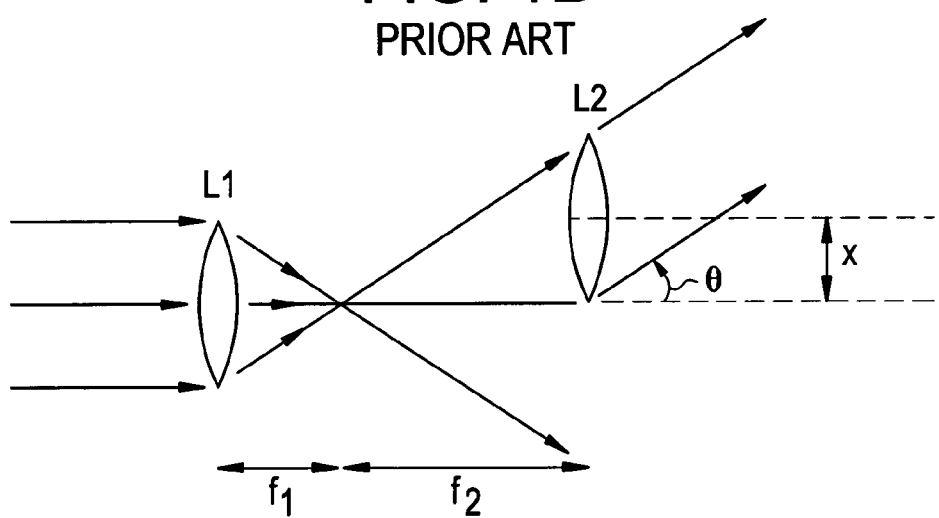
Figure 1C:
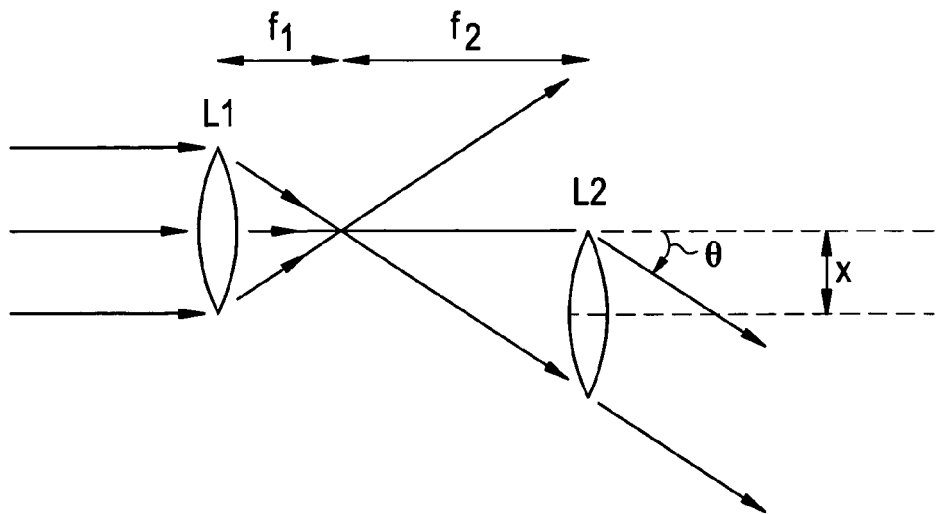
Figure 1D:
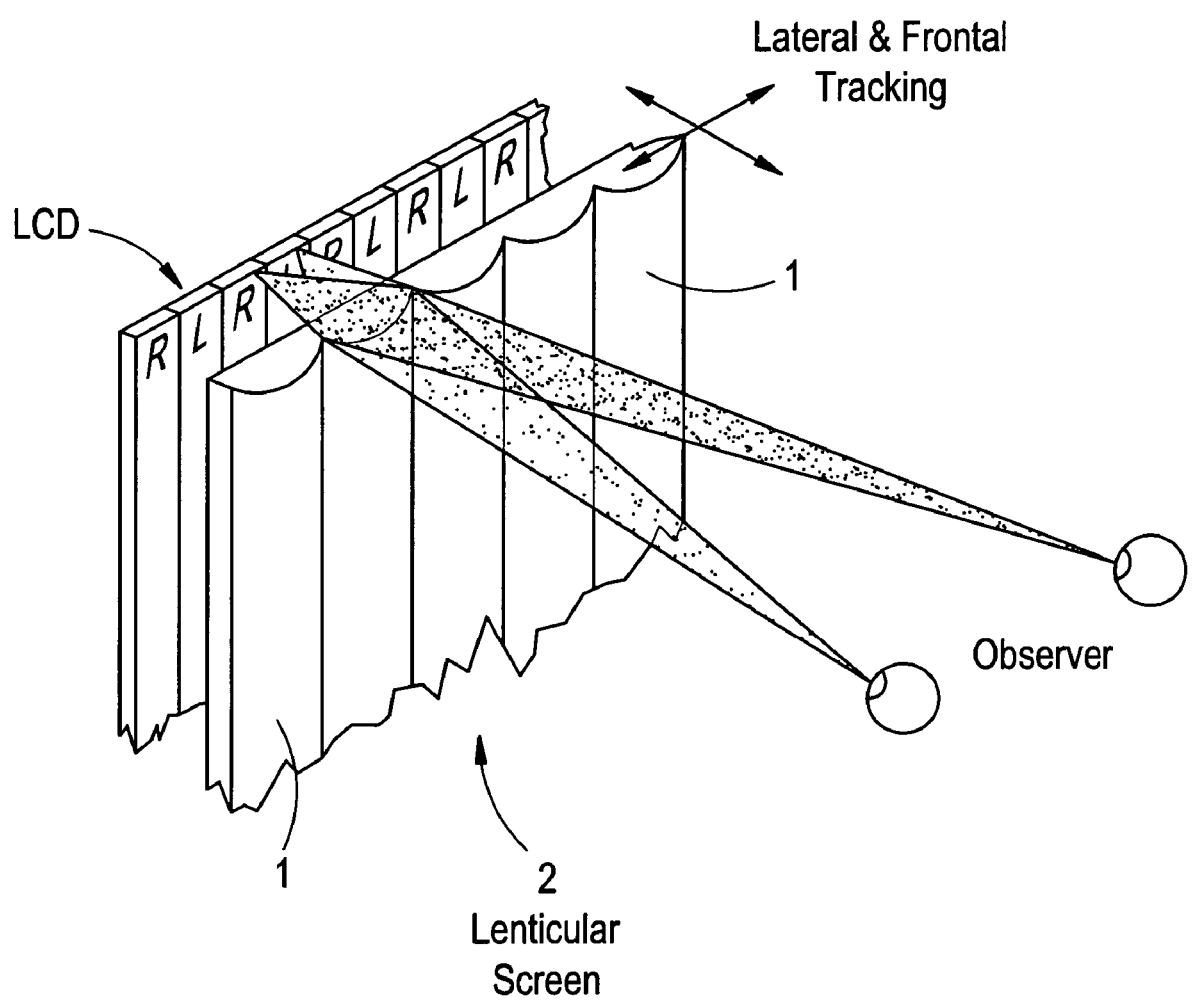
FIG. 1D is a perspective view of a lenticular screen.

For introduction, FIG. 1D shows a single lenticular screen 2 array that has been used to create "no 3D glasses required" or "autostereoscopic" displays which use a sheet array of lenticular lenses 1 to steer interdigitated left (L) and right (R) eye views to a properly positioned observer. As shown in FIG. 1D, a right eye image (R) and a separate left (L) eye image, i.e., two view angle dependent slices of the an image, are sent through a lenticular lens 1 or lenticule resulting in each image (R,L) being sent to the appropriate eye for viewing. This forms a stereoscopic 3D effect.

Figure 2:
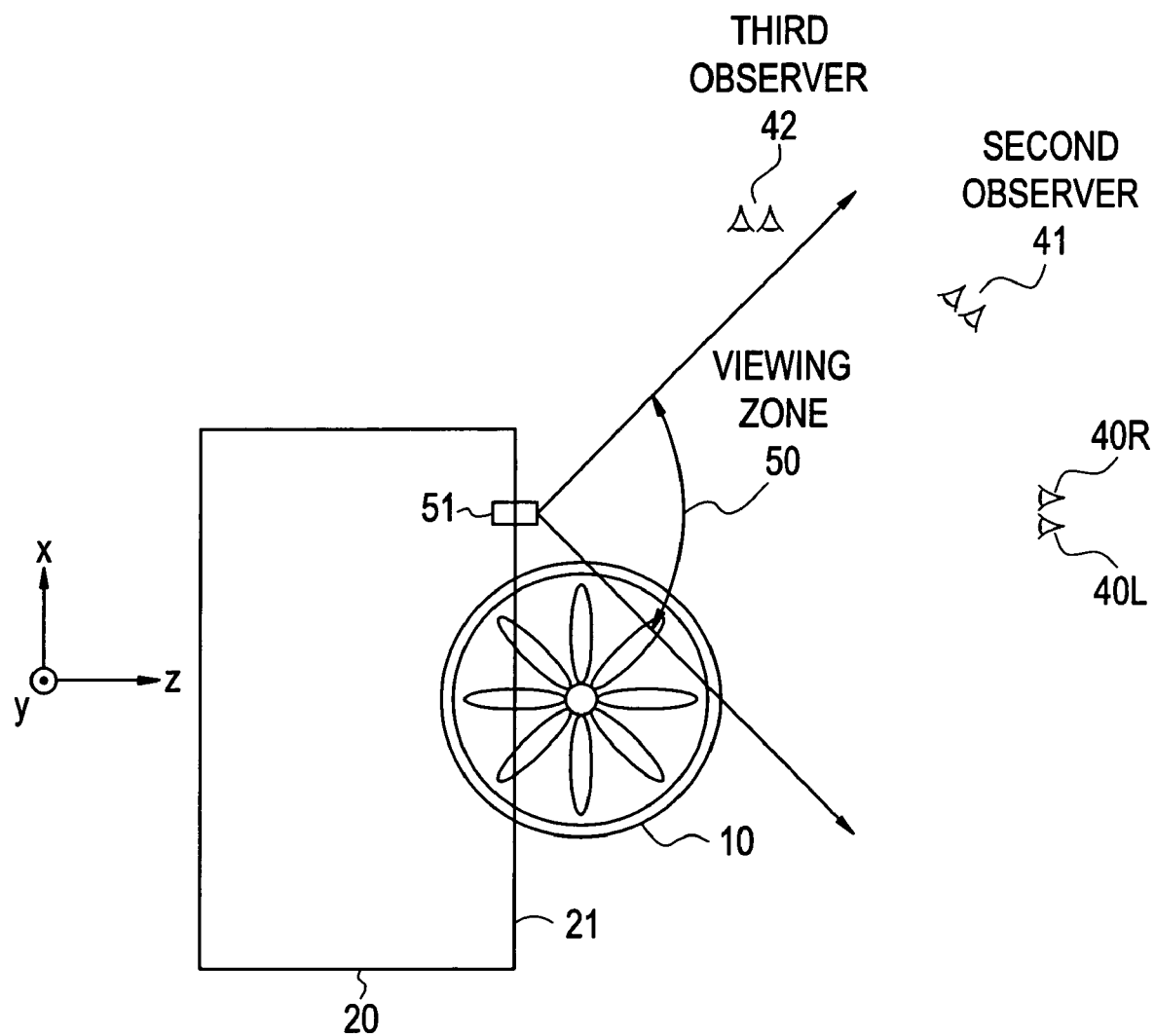
FIG. 2 is a top view of a 3D image being projected from a display screen.

For further background on image formation and 3D display, FIG. 2 is a top view of a 3D image of a flower being displayed. A 3-D scene 10 of the flower is projected from the image surface 21 of a 3-D display 20, see the x, y, and z axes shown. An approximate measure of the horizontal viewing angle of the 3-D scene 20 is a viewing zone 50. Here, the horizontal angular extent of the horizontal viewing zone 50 is defined as the radiative angular extent of a typical pixel 51 in a plane parallel to the xz plane. Here, the imagery is visible to a first observer 40 and a second observer 41 because they are within the horizontal viewing zone 50 but not to a third observer 42 who is outside of the horizontal viewing zone 50.

In order to form 3D output images, the outputted 3D image must be prerecorded or rendered as 2D views. See FIG. 3C which illustrates the generalized process of computing and depicting 3D scenes using a multi-view methodology. This process is well known. Specifically, projection of multi-view 3D imagery follows several steps. First, view-specific data and/or images are acquired from a set of physical or computational (synthetic) "cameras." For example, we illustrate a desired scene 22 of a flower in a flowerpot. A series of computer-graphic cameras 23 compute the appearance of the desired or selected scene 22 from a multitude of positions along a horizontal track 24. Typically, 30 to 200 views are rendered. We refer to a leftmost image 100 and a rightmost image 199, and images between have numbers between 100 and 199. Playback or reconstruction of the desired or selected scene occurs when the 3-D display 20 projects rays of visible light to several locations and/or selected locations. In this example, the left most depiction 100 is projected by a ray bundle 100' in FIG. 3D, and an intermediate depiction 110 is projected by a ray bundle 110'. In this case, bundles 100' and 110' each meet at an apex, or pupil when an observer places his left eye 40L at the pupil formed by bundle 100' and his right eye 40R at the pupil formed by bundle 110', he sees images 100 and 110. When the observer moves horizontally within the viewing zone, the observer experiences motion parallax, that is, he is able to look around the objects in the scene 22. Also, for a sufficient number of reconstructed views (such as two fitting within the horizontal extent of the observer's pupil), the observer may experience a focusing or "accommodation" response. Also, the user's eyes will respond to vergence cues that cause them to rotate their optical axes to intersect at the region of gaze. Thus, the viewer is presented with motion parallax and stereo disparity cues that closely mimic real 3D object viewing conditions. Thus, the concept of multiview displays has been introduced. Lenticular displays are a sub-set of the multiview display group.

Note that the display system may be constructed such that, for a given instant in time, the ray bundles do not meet at an apex but rather travel together in a mutually "collimated" or telecentric manner. In this alternative, at various instants in time, the ray bundles exit the image surface with different trajectories, so that aggregated over the persistence of vision, pupils do form at the locations shown.

Also, for background, prior art FIGS. 1A-1C show a single lens translating system. First lens L1 is fixed and does not move, while second lens L2 is displaced relative to L1. By comparing FIGS. 1A, 1B, and 1C the concept of beam steering the rays by translating the second lens L2 is illustrated by the displacement of L2 relative to L1.

Also significantly, in this basic example, some rays from L1 are not incident upon L2. These "non-directed" rays form what are termed ghost images and are not desirable for the overall output image quality. Thus, in FIGS. 2A-3B arrays or films of minute lenticular elements (A1, A2) which may be on the scale of several microns (microlenses) work together to reduce the ghost image problem by reducing the area in which a ghost image would form known as the perimeter of the viewing zone. Additionally, these small arrays also provide other benefits including enabling a wider resultant output view angle to be formed.

In various embodiments of the present invention, the basic ideas described above can be used with more advanced scanning systems for a variety of applications including three-dimensional (3D) display, as is described further below.

Referring again to FIGS. 2A, 2B, and 2C, one application of such an apparatus is beam scanning. In this case, at least one of the arrays, for example A2, is translated along a direction orthogonal to the optical axis. This translating movement provides a method for scanning an incident collimated wavefront by altering its direction of travel upon exit from the scanning assembly. Furthermore, the proportion of change in exit angle (the scan angle) is proportional to the displacement of the translating array (or arrays) such that the scan angle of the system can be precisely controlled. The maximum extent of the scan angle is determined by the f/# (diameter to focal length ratio) of the lenses in the scanning assembly. The instantaneous scan angle (θ) is determined both by the diameter of the lenses and the displacement of the translating or rotating lens array (or arrays).

A simple example provides illustration of these concepts by reference to FIGS. 1A-1C with two arrays each consisting of just a single lens (L1 and L2 respectively). Lens L1 has a focal length of f1 and lens L2 has a focal length of f2. The two lenses have the same diameter, and their separation is equal to the combined distance f1+f2. In this arrangement, an incident collimated wavefront exits the optical system collimated but traveling at an angle θ, which is proportional to the displacement X of lens L2 relative to the optical axis of the incident wavefront.

One advantage to using a lens array scanning assembly with arrays having multiple lenses is that the effective scanning aperture can be arbitrarily large because it is determined by the sum of the diameter of the individual lenses in the array. Also, with smaller lenses, the displacement needed to reach the maximum scan angle is reduced, which can reduce the work required from the scanning motor to a reasonable amount.

Figure 2A:
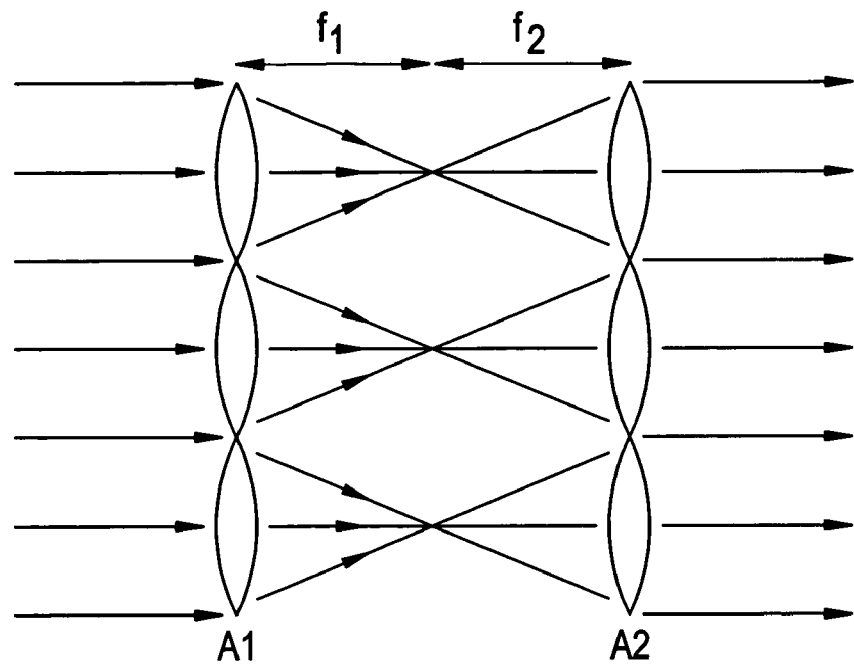
FIGS. 2A-2C depict two arrays employing three lenses.
Figure 2B:
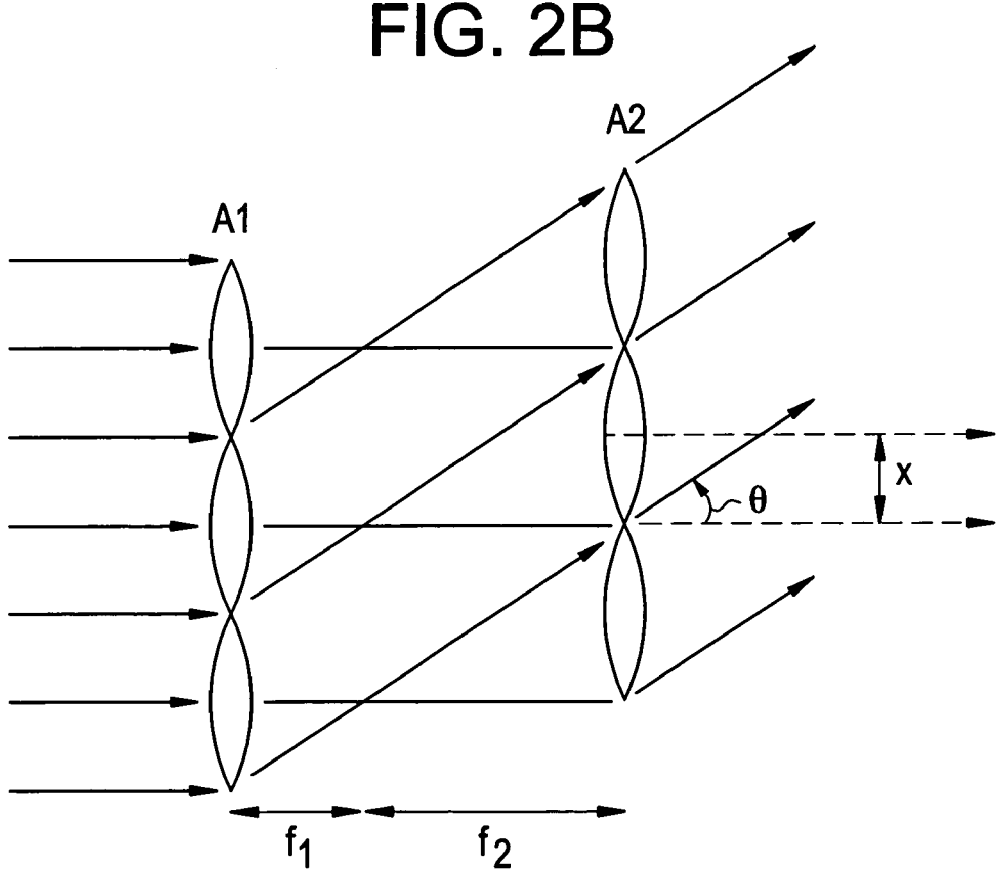
Figure 2C:
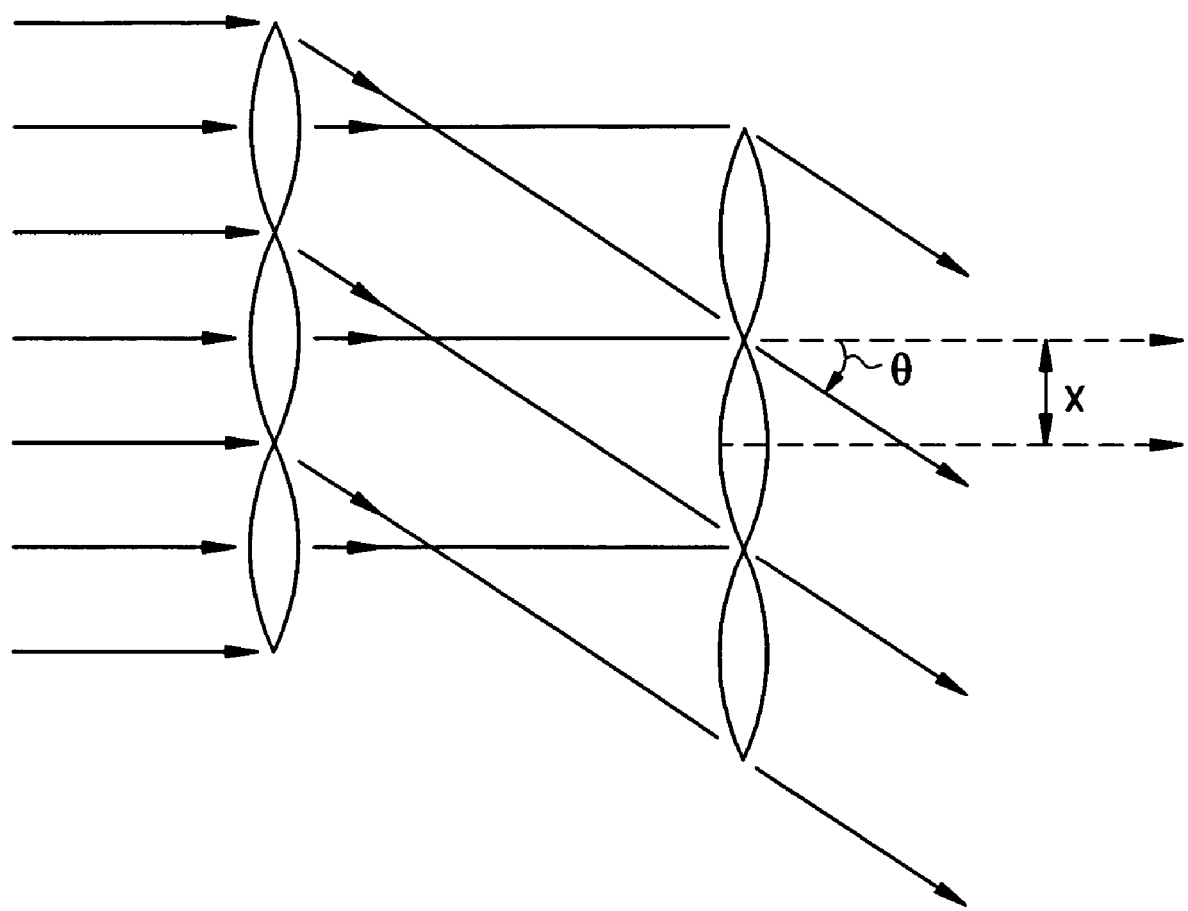

The advantages described in the previous paragraph are demonstrated in FIGS. 2A-2C, which consist of two arrays (A1 and A2) of three lenses. The lenses in A1 have a focal length f1 and the lenses of A2 have a focal length f2. The separation between the two arrays is the configured to be about the combined distance f1+f2. The lenses of each array have a diameter equal to about one third the diameter of the lenses in FIG. 1 so that the width of each array is essentially equal to the diameter of the lenses of FIG. 1. Thus, the lens array scanning assemblies of FIG. 1 and FIG. 2 exhibit the same scanning aperture, which is to say that they can accept an incoming wavefront of the same size without vignetting. However, it is evident by comparing FIG. 1B and 2B that an equivalent scan angle (θ) is achieved in FIG. 2B with a much smaller displacement X of the second lens assembly than in FIG. 1B.

Figure 7:
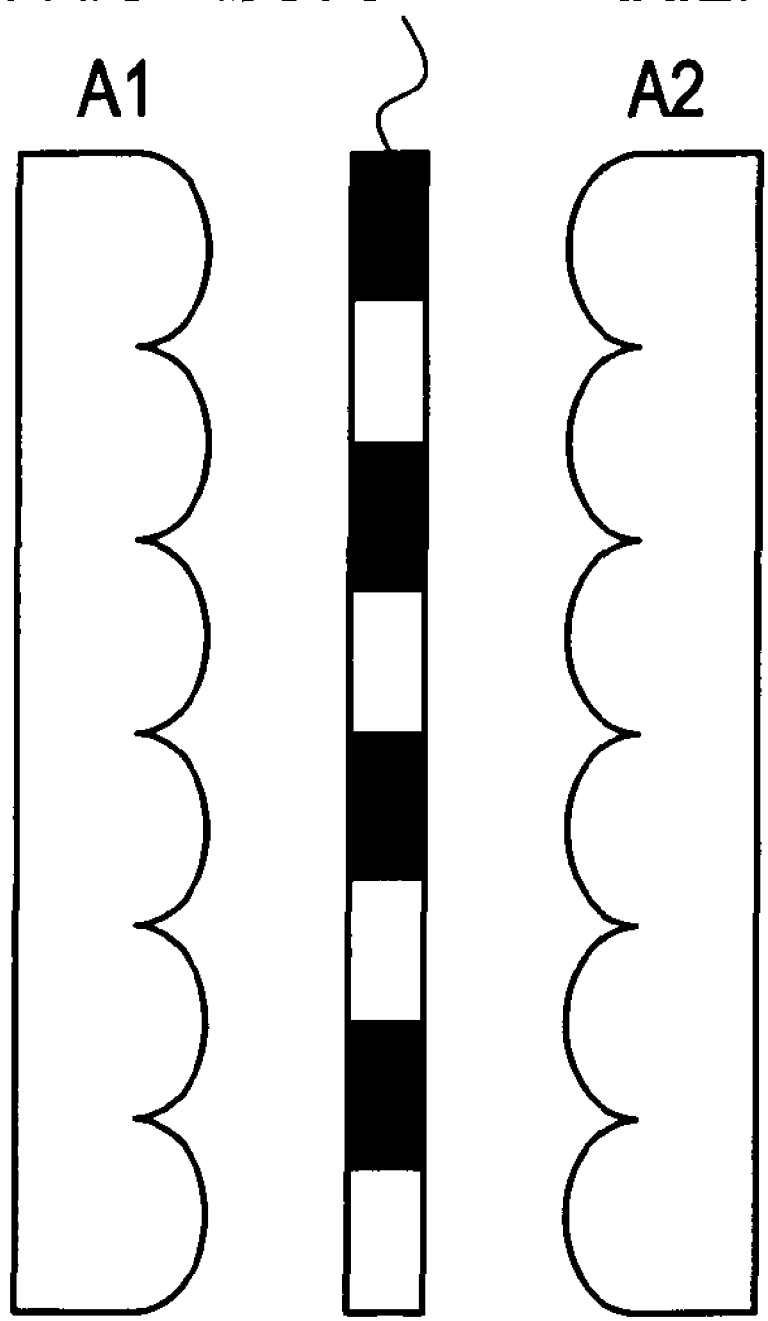
FIG. 7 is a diagram of an embodiment having an additional optional rectangular aperture array.

FIGS. 1A-1C and 2A-2C each show three instantaneous scanning configurations. It will be appreciated that a continuous scan angle may readily be achieved by applying a continuous displacement to the second assembly. It is also apparent from FIGS. 1 and 2, that certain rays may exit the lens array scanning assembly at an undesirable angle (not drawn) and produce crosstalk or ghost images in the output wavefront. Advantageously, crosstalk can be curtailed with a physical or software based "mask", which blocks out groups of rays on the incident wavefront so that only the desired rays exit the system. As shown in FIG. 7, an example of a physical barrier would be an additional aperture array with 50% duty cycle for example. In the diagram, the aperture array is placed between the two lens arrays, however, the location of the aperture array will be different depending on the optical configuration.

Figure 4A:
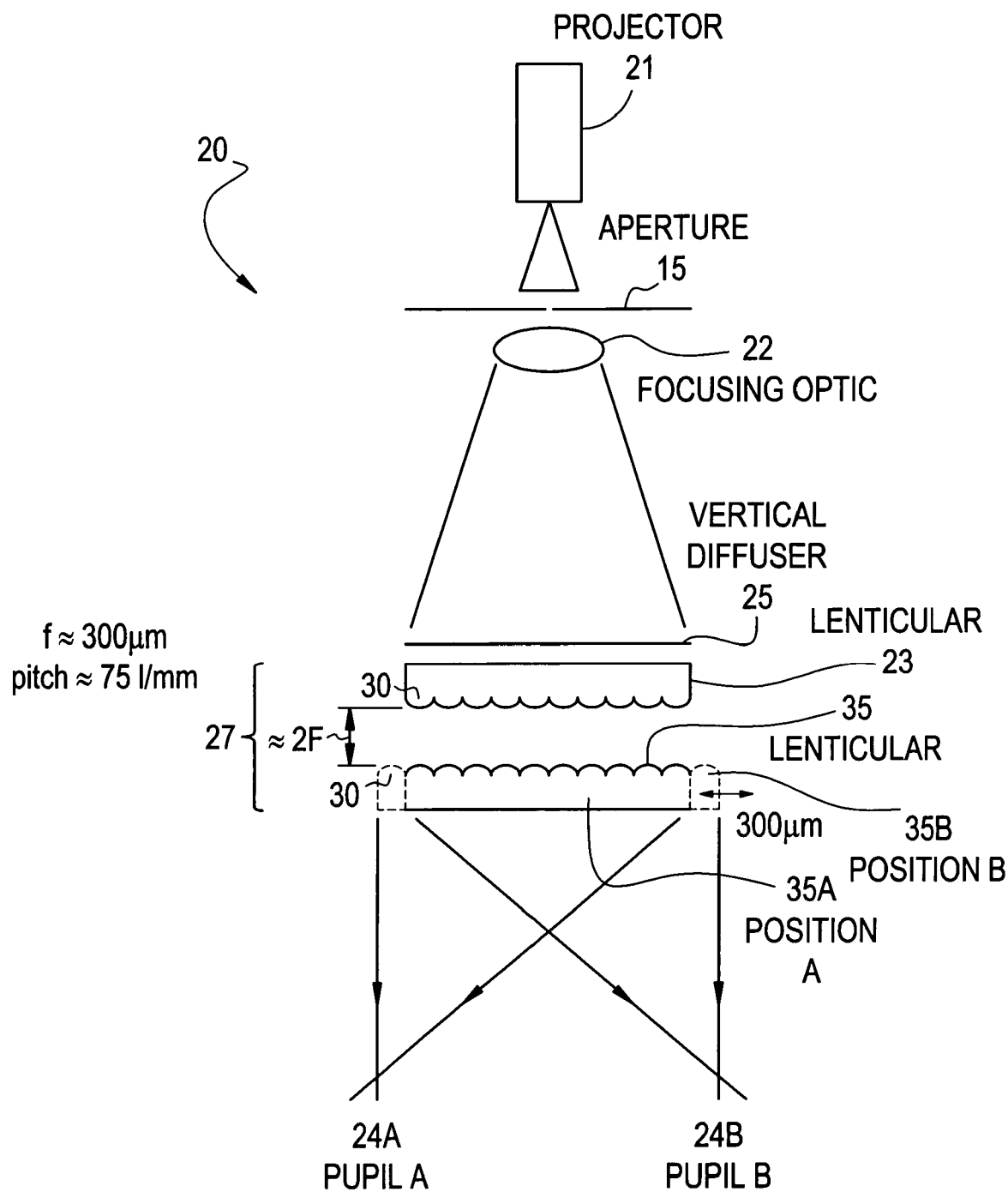
FIG. 4A is a top view on an embodiment.

Reference is now made to two examples of the present embodiments shown in FIGS. 4A and 4B. The optical scanning system 20 shown includes a lens array scanning assembly 27 that includes two or more arrays of one or more lenses and means for changing or translating their location or orientation with respect to each other. At least one of the arrays 35, is translated so that the center of lenses in the adjacent array 23 are no longer the same distance from the optical axis. The translation may be very small in distance because micro-arrays in the micron range may be used, but it is still effective. Thus, this lenticular scanned multilens solution may comprise two back-to-back lenticular micro-arrays (23, 35) forming an array of optical trains. By shifting one of the lenticular arrays 35, the axis of the lens array system is sheared and the chief rays through each system are bent or refracted at a similar angle to produce a scanning effect. This array scanning assembly 27 is discussed below.

In the embodiment shown in FIGS. 4A and 4B, a first lens array is comprised of a stationary first lenticular array 23 made of aspherically shaped cylindrical lens elements 30 or lenticules. The second lens array is moveable or displaceable in regard to the first lens array and is comprised of a second lenticular array 35 also made of aspherically shaped cylindrical lens elements 30. The lens elements 30 are shaped to reduce aberrations and are known as corrected lenses. The elements also are fashioned into an integral array, so that the individual elements do not move within each integral array of elements. Additionally, it is possible to use a doublet lens arrangement wherein a second thin layer or corrected lens is included above the surface of the lens elements 30 to reduce aberrations. It is also possible not to use lenticular shaped lenses and to instead use hemi-spherical shaped lenses, or lenses of other shapes.

If two arrays of hemispherical lenses are used for the scanning assembly, it is further possible to direct the output beam with two degrees of freedom. This is achieved by translating one of the lens arrays along both the horizontal and vertical axis. One application for scanning in two dimensions is for use in a "full" parallax display. In such a display, a bundle of rays is emitted from the scanning assembly which provides some or all view information to one or more viewing locations. The bundle of rays is scanned along both vertical and horizontal axis such that an abundance of both vertical and horizontal viewing locations intersect a unique set of rays.

FIGS. 4A and 4B show two possible optical configurations for a 3D display which utilizes the said scanning assembly. In FIG. 4A, individual pupil points are formed in the viewing zone for instantaneous scanning assembly configurations because the double lenticular screen acts as a composite lens system which images the exit pupil of the projection system. The imaging properties of lens arrays are well documented by Stevens and Hutley. When an observer places the pupil of their eye at the exit pupil location, they can see imagery on the screen assembly. As the screen assembly progresses to different scan angles, the exit pupil translates in the viewing zone, thus creating angle dependent imagery. In contrast, in the embodiment of FIG. 4B, a Fresnel lens 26 is included, and at any instant in time, the rays are parallel, but integrated over a period of an angular sweep so that an observer will intercept beams coming at a variety of angles.

Figure 5:
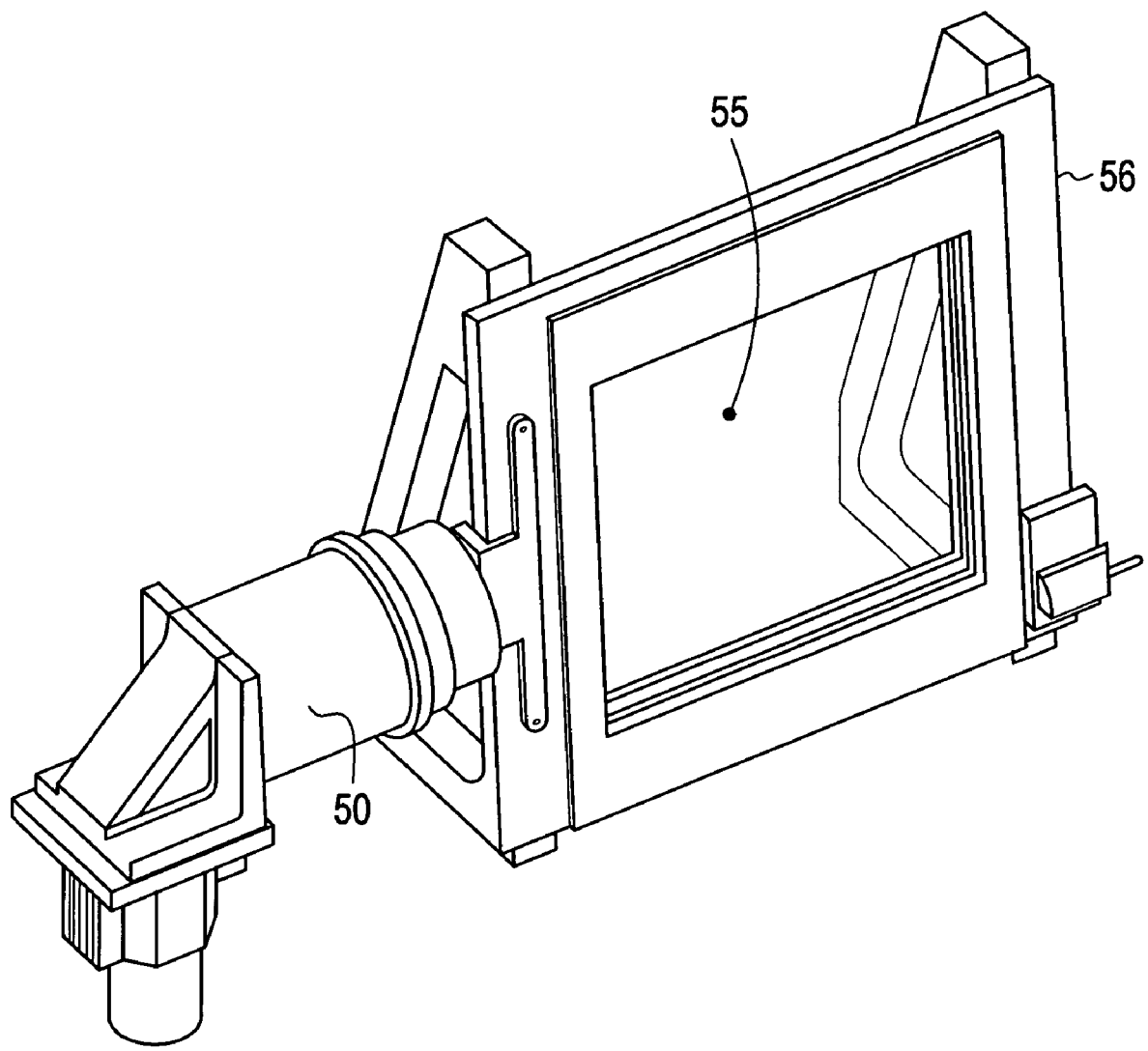
FIG. 5 is a perspective view a display screen and drive.
Figure 5A:
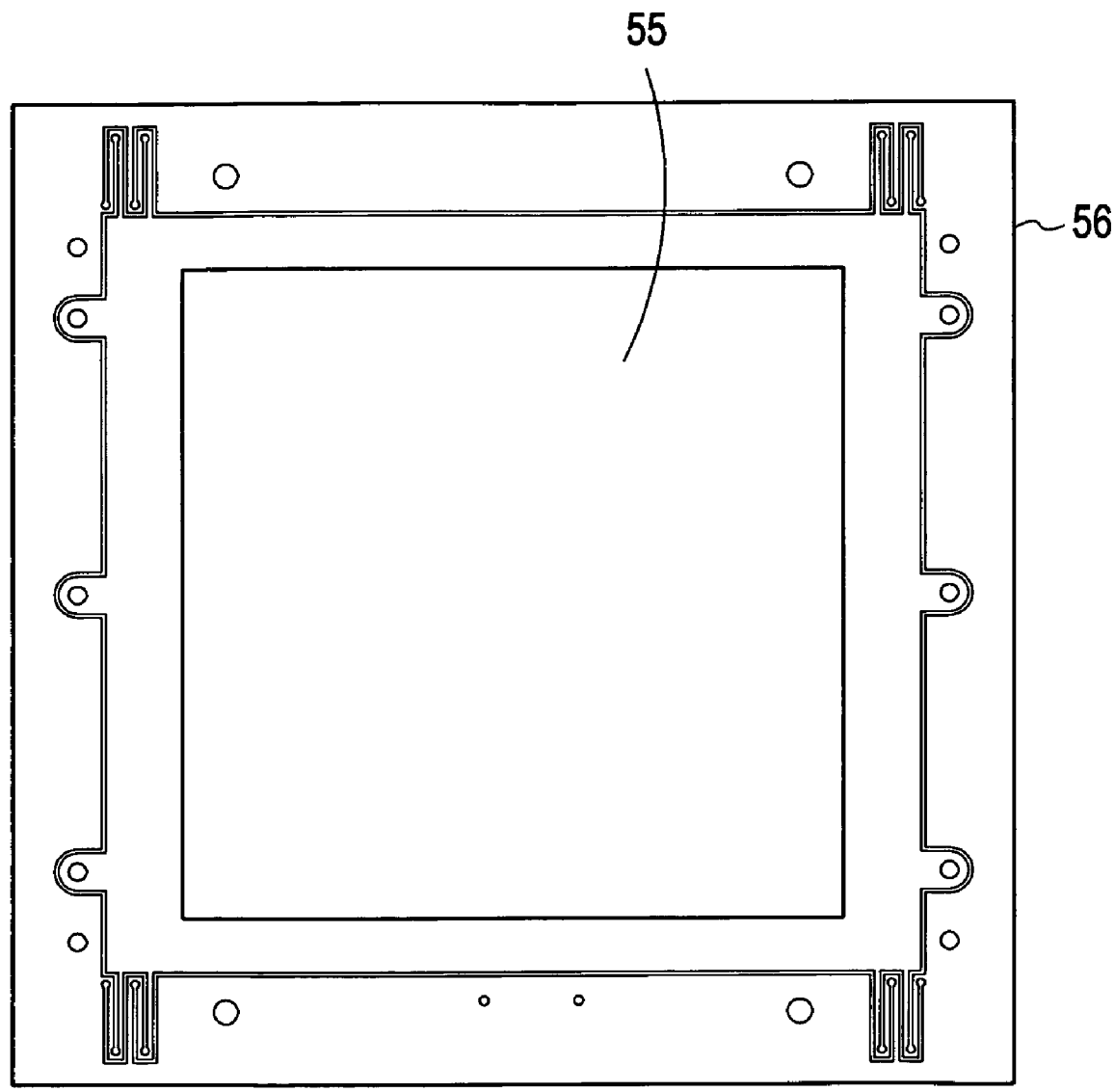
FIG. 5A is a front view of flexure stage and display screen in accordance with an embodiment.

In order to displace, translate, or move the second lenticular array 35, a servo drive motor 50 may be implemented as shown in FIG. 5 to form 3D display screen 55. This system can be termed a "vibrating" lenticular scanning system because the second lenticular array 35 moves back and forth, translates, or oscillates at a high rate as part of the flexure stage assembly 56. For example, the oscillation occurs at 30-60 Hz in this embodiment. At that rate, human "persistence of vision" makes the image appear clear and substantially flicker free in appearance. To illustrate the oscillating movement, see FIG. 4 and compare position 35A shown in solid lines to displaced position 35B shown in dashed lines. The electronic control of the display screen 55 is explained in another discussion below.

Figure 3A:
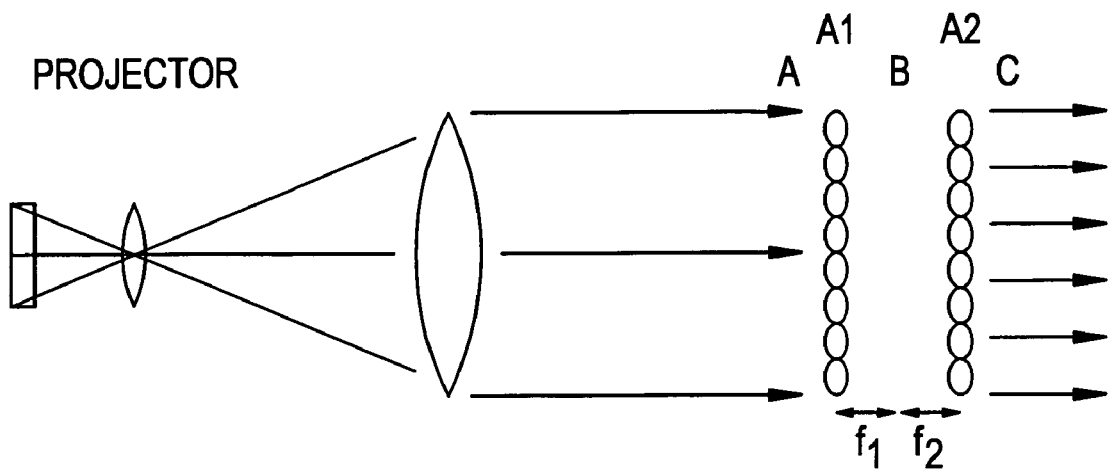
FIGS. 3A-3B depict a lens scanning array assembly in accordance with an exemplary embodiment.
Figure 3B:
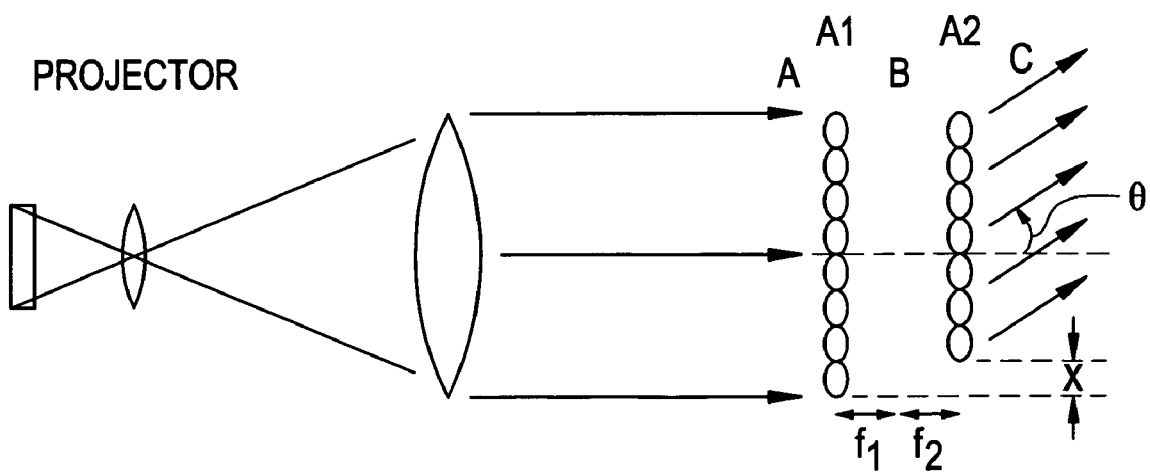
Figure 3C:
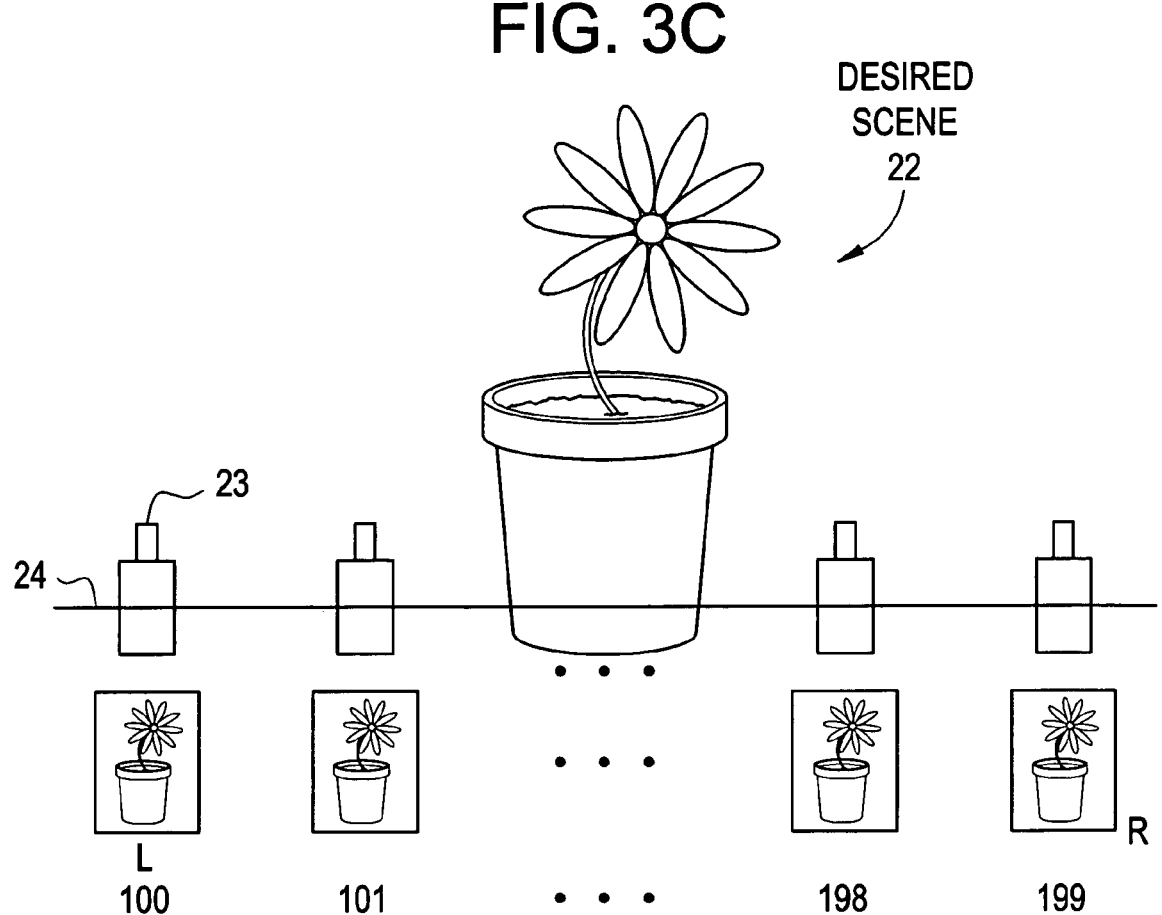
FIG. 3C depicts a method of recording 3D images with multiple cameras to capture different angular viewpoints of the object to be reproduced as a 3D image.
Figure 3D:
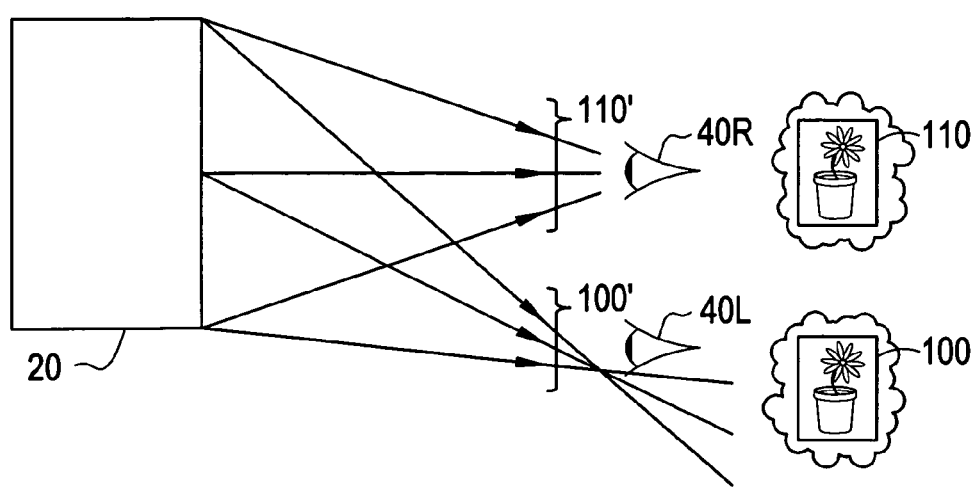
FIG. 3D depicts display of images to a right and a left eye.

Additionally, a lens scanning array assembly in accordance with an exemplary embodiment is depicted in FIGS. 3A-3B. In this embodiment, the lens array scanning assembly is employed in a 3D display apparatus whereby two arrays of cylindrical lenses are placed back-to-back. An array may include, but is not limited to, as many as 100 to 1000 lenses of relatively small (0.3-3 mm) diameter. Each of the lenses within an array (A1, A2) has a common focal length where f1=f2. Preferably, the two lens arrays have substantially identical profiles so that they can be manufactured at the same time for cost efficiency. The spacing between the two arrays is established as substantially equal to the sum of the focal lengths of the individual lenses in the arrays. The two lens arrays together comprise the lens array scanning assembly.

The arrays (A1, A2) are aligned so that the height of the cylinders lies along the vertical axis of the image plane. The lens array scanning assembly is placed in the image plane of a telecentric projection system. A two-dimensional (2D) image is presented on the lens array scanning assembly by a wavefront of light that consists of substantially collimated rays. Upon exit from the lens array scanning assembly, the incident wavefront will emerge traveling in a direction determined by the translation of the second lens array A2.

Since an exemplary embodiment utilizes lenses of small diameter, the displacement necessary to achieve the maximum scan angle is quite small. The translation of the second lens array can be electronically controlled by a piezoelectric translation stage or servo controlled flexure stage 56 for example or other means. A periodic displacement is achieved by applying a periodic drive voltage to the piezoelectric. The displacement is one-dimensional along the horizontal axis of the image plane. The wavefront that exits the lens array scanning assembly is therefore only scanned along the horizontal axis of the image plane. To allow the image to be viewable over a significant vertical extent, an optional vertical diffuser 25 may be placed at positions A, B, or C along the optical axis in FIG. 3.

Figure 10A:
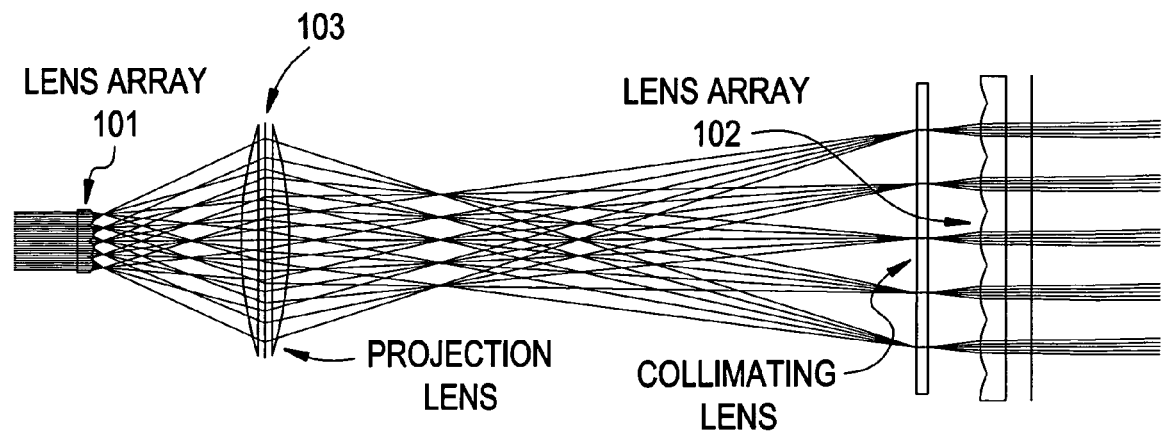
FIGS. 10A-10B are raytraces of a system in which a projection lens and a collimating lens are between the first lenticular array and the second lenticular array
Figure 10B:
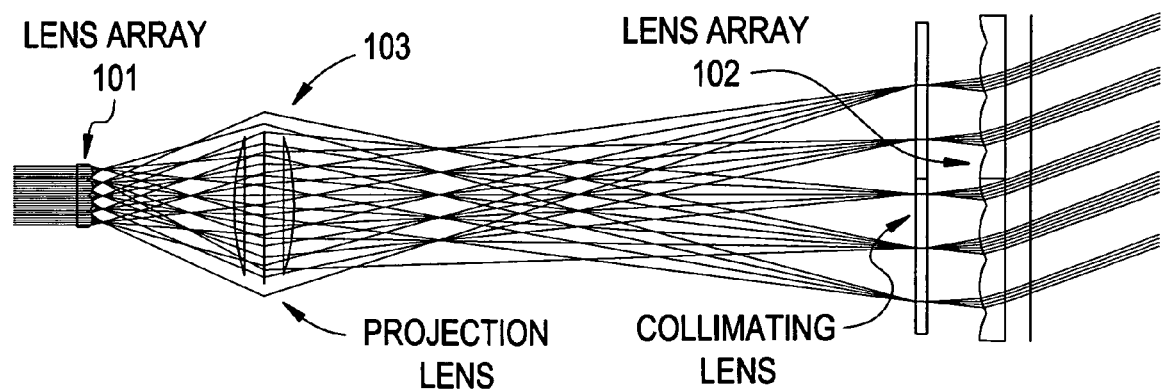

Another scanning lens assembly in accordance with an exemplary embodiment is shown in FIGS. 10A-10B. This scanning assembly consists of a first lens array 101 (comprising a plurality of lens elements) in optical communication with an optical assembly 103 which is further in optical communication with another lens array 102. This type of scanning assembly has the advantage that the sizes of the two lens arrays (101, 102) need not be the same, for instance if the intermediary optical assembly 103 is a magnification system.

An important property can be achieved if the first lens array 101 is made significantly smaller than the second array 102. If the first lens array 101 is displaced to create the scanning motion, the inertia of this array will be small and the complexity of the mechanical operation will be much more favorable than in systems with larger lens assemblies. Since the second lens array 102 can be made much larger than the first lens array 101, the output can have a large aperture. This is desirable for systems such as the 3D displays described in previous embodiments where the output is the image plane and large image sizes are desired.

The scanning angle of the lens array scanning assembly is preferably synchronized with a high frame rate spatial light modulator (SLM) such as a Texas Instruments DMD™ device or equivalent serving as part of projection means 21. The SLM may project "patterned" 2D images that are time varying, taken from a certain angular perspective, and/or based on bitmaps for example. The synchronization is such that a wavefront modulated by the SLM is emitted from the lens array scanning assembly at an instantaneous angle. The amplitude characteristics of this wavefront can be updated by the SLM when the scanning state returns to the same instantaneous scan angle on the next scan cycle. The scan cycle is set to be greater than the perceivable flicker rate (>30 Hz) so that the emitted wavefronts from each instantaneous scan angle can be observed simultaneously by a viewer of the said 3D display without noticeable flicker.

In an exemplary embodiment a software based "mask" is employed to prevent crosstalk or ghost images from wavefronts emitted at different instantaneous scan angles. In one embodiment, this mask is implemented simply as a rectangular grid pattern, which blacks out groups of pixels in the projected image.

In this embodiment, it is particularly advantageous to have the scan angle be independent of the projection system for the purposes of a 3D display apparatus. The scan angle of the lens array scanning assembly will determine the observable viewing angle of the subsequent 3D display. The size of the 3D image presented on such a display is determined by the magnification of the projection system (and the size of the lens array scanning assembly).

Control Electronics

Figure 8:
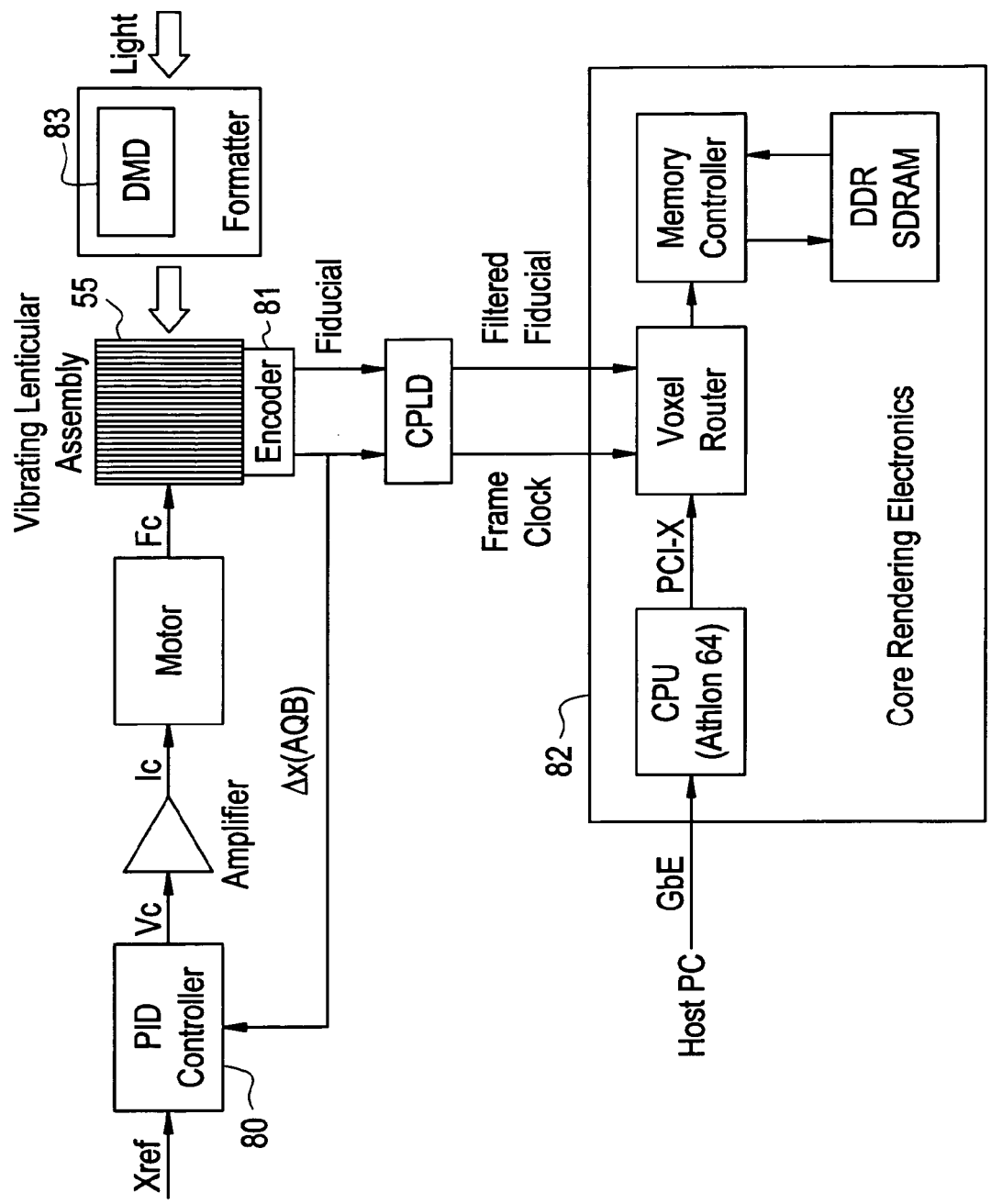
FIG. 8 is a schematic diagram of control electronics according to an embodiment.

With reference to FIG. 8 an exemplary embodiment is shown wherein the vibrating display screen 55 comprised of the two lenticular or lenselet arrays with a plurality of lenslets (25, 35) and flexure stage assembly 56 is controlled by a PID (proportional-integral-derivative) controller 80 which monitors the motion of the vibrating display screen 55 using a diffractive motion encoder 81, and which drives a "voice coil" motor and the mechanical flexure stage assembly 56. The details of the PID control loop would be well-understood to those skilled in the field of servo control electronics and are therefore not discussed at length herein.

A core rendering electronics subassembly 82 assists in generating the sequence of 2-D perspective views projected by a fast DMD-based microdisplay projector 83. The core rendering electronics 82 also receives velocity and position data from the PID controller 80 control loop. In this case, the core rendering electronics 82 are slaved to the vibrating display screen 55. Alternatively, the core rendering electronics 82 can act as master to the vibrating display screen 55.

It is significant that the vibrating display screen 55 undergoes time-varying optical properties, and that a projector that is located distant or apart from to the vibrating display screen 55 shines light on or through it to produce a 3D image.

Figure 9:
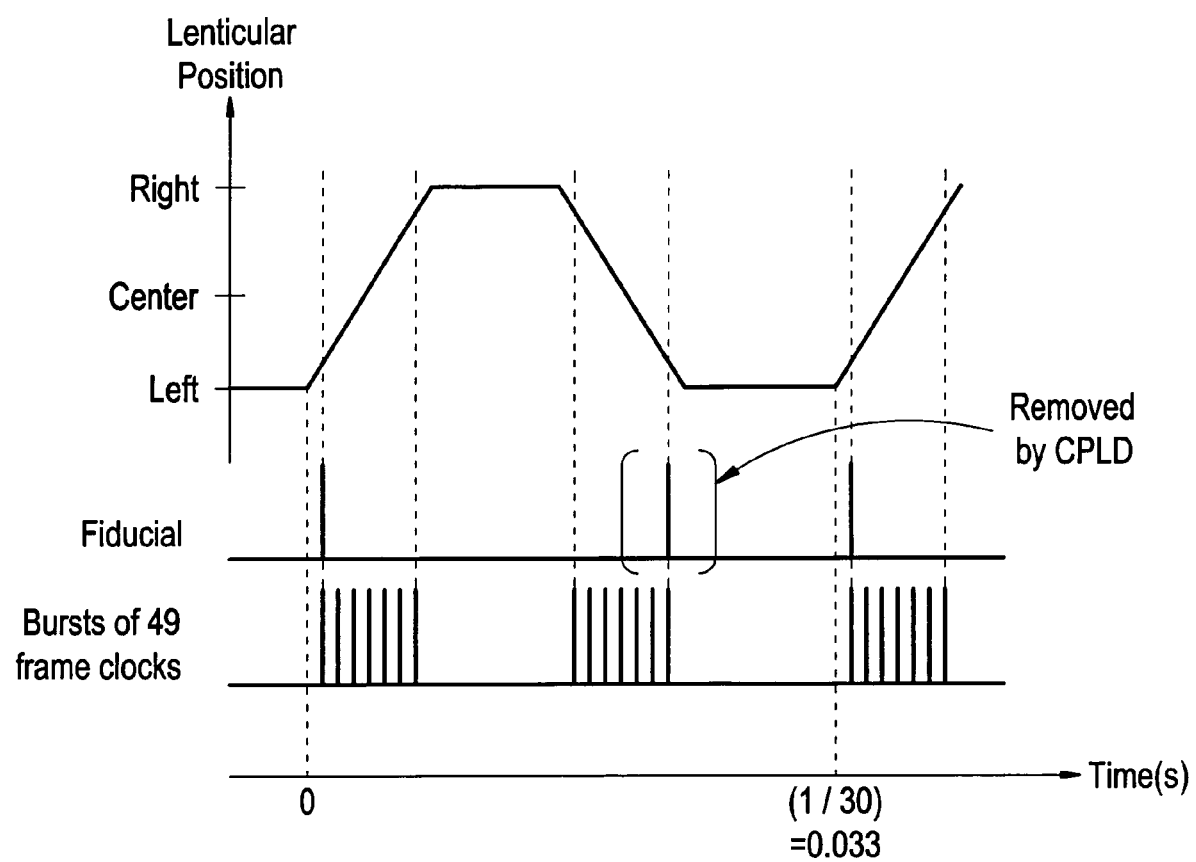
FIG. 9 graph of lenticular array position verses time in milliseconds according to an embodiment.

With reference to FIG. 9 it is noted that the vibrating display screen 55 may spend a significant interval of time on both sides of its scan (see flat regions of graph for Left and Right). If light passed through the screen during those intervals, it would be too bright to be displayed properly. Therefore, "blank" (black) data are loaded into the extreme views. A $49^{th}$ clock is used to trigger a pre-load of a black screen for those views.

A significant benefit of this solution is that the system does not introduce scan dependent color aberrations since it is a refractive element and not a diffractive one.

Other examples or additional views of the exemplary embodiments are discussed below.

Image Plane Lenticular Scanner

In this approach shown in FIGS. 6A-6F, the lenticular scanner arrays are placed at the image plane of a projection system. In this Image Plane Lenticular Scanner design, the lenticular scanner is placed at the final image plane of the system, and thus becomes the "screen" of the display, i.e., vibrating display screen 55. Conveniently, lenticular sheet arrays are frequently fabricated at standard CRT display sizes so sizing the display is not an issue. The "arrays" are made of a plurality of lenslet elements.

As described in more detail below, FIGS. 6A-6B are ray diagrams of a lenticular scanning system screen in accordance with an embodiment without Fresnel lenses. FIGS. 6C-6D are ray diagrams of a lenticular scanning system screen in accordance with an embodiment having one Fresnel lens. FIGS. 6E-6F are ray diagrams of a lenticular scanning system screen in accordance with an embodiment having two Fresnel lenses.

As shown in FIGS. 6A-6D, the lenticular scanner processes through different scan angles, the position of the exit pupil 64 translates in the viewing zone as shown, thus providing view-dependent imagery to an observer.

In FIGS. 6C and 6D, a projection lens of the projector 21 magnifies an image of a digital micromirror device (DMD) onto a collimating Fresnel lens 61. The image may be a time varying, view sequential, and/or modulated image. It may be formed from a 2D bitmap or other format. The image then becomes telecentric and is introduced into the lenticular scanner 25. The scanner 25 redirects the chief rays of the image as shown by comparing FIG. 6C to 6D. In contrast, in FIGS. 6A-6B, scanning is accomplished without use of a Fresnel lens.

As shown in FIGS. 6E and 6F, an additional Fresnel lens 62 may also be used to reimage the aperture of the projection lens to the desired or selected viewing position in a collimated beam 63.

A similar version of this system can be constructed which omits the second Fresnel lens and results in a telecentric image, further reducing the necessary components. With different rendering, imagery identical with the unaltered system can be displayed.

Because this embodiment of the system requires a fast (50 Hz) scan rate over a small distance, it was necessary to design a host for the lenticular array 35 sheet which undergoes the translation. In the design, the host is attached to the lenticular array 35 at the corners on four free-floating pads on the flexure stage 56 which allow a shearing motion that provides the appropriate translation. The lenticular array 35 is driven by a servo motor 51 with an encoder 81 to provide accurate feedback of lenticular position over time. Because the desired lens pitch is quite small, the desired lenticular translation is also small. This image shows the lenticular carrier designed to translate a lenticular +/−0.5 mm at frequencies up to about 60 Hz.

One or more additional lenses may also be included with the overall optical assembly. For example, a single condenser lens can be included directly before the lenticular scanner 25 or which substantially collimates the rays entering the lenticular scanner 25. One reason this can be advantageous is because the fields entering the individual lens elements in the lenticular scanner 25 are closer on-axis, and thus are less likely to cause aberrations typical in wide field of view systems such as coma. If a single collimating lens is used, the output of the scanning assembly produces a substantially collimated beam. If it is intended to create a 3D display from such an assembly, the rays converging to a particular viewing location will be formed from portions of the collimated beam emerging from successive instantaneous scan configurations. Alternatively, a second condenser lens can be included directly after the scanning assembly which causes the instantaneous beam which emerges from the assembly to converge to a particular viewing location. As discussed above, it may be advantageous to use Fresnel lenses for one or more of these elements since the required aperture size is considerably large and a very thin surface is desired. Additionally, instead of traditional lenses other "optics" per se may be substituted. For example, holographic optical elements (HOE), parallax barriers or elements, or adaptive or active wavefront shaping and/or modulating elements like LCD arrays, bimorphic mirrors, or piezoelectric arrays may also be used for example. This not meant to be limited or an exhaustive list, as many exemplary optical elements or "optics" may be used as one skilled in the art will appreciate. Therefore, an "optic" per se as used in this application comprise at least one: lens, array of lenses, and/or the above devices and may also be any at least one: lens, fiber optic, modulator (active or passive), prism, or mirror of an optical instrument. Rotational or rotating optics may also be used.

It should also be noted that the figures may depict additional elements, connections, interconnections and the like as may be employed for implementation of a selected control configuration. For example, transport delays may be employed to ensure that date time coherency is addressed. Likewise, scaling may be employed to address unit conversions and the like, and limiters may be employed to clamp selected signals.

As will be appreciated, the disclosed embodiments can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A 3D display apparatus comprising:
a projector for projecting view sequential images;
an image scanning assembly for scanning and displaying the view sequential images to create a 3D display comprising:
a first group of lenses; and
a second group of lenses;
wherein the second group of lenses is periodically and repeatedly displacable with respect to the first group of lens in coplanar first and second directions in order to scan the view sequential images to selected view points to create 3D view sequential imagery.

2. The 3D display apparatus of claim 1 further comprising:
an image rendering electronics controller structured to control the projector and to control the image scanning assembly based on positions of the groups of lenses detected from the image scanning assembly to synchronize the projector with the image scanning assembly.

3. The 3D display apparatus of claim 2 wherein the image rendering electronics controller and the image scanning assembly are electrically connected to the projector and to the image scanning assembly.

4. A method for 3D display comprising:
projecting images from a projector;
scanning and displaying the images via an image scanning assembly having at least a first optic and a second optic wherein the scanning and displaying comprises:
sending the images through the first optic;
sending the images through the second optic for display; and
periodically and repeatedly displacing at least one optic in regard to the other optic in first and second coplanar directions to scan the images to selected angular viewpoints to create 3D imagery.

5. The method for 3D display of claim 4 further comprising:
synchronizing and controlling the projector with the image scanning assembly via an image rendering controller to control the projector and to control the image scanning assembly based on position data regarding positions of the optics detected from the image scanning assembly.

6. The method of claim 4 wherein at least one of the optics comprises lenticular lens elements.

7. The method of claim 4 wherein at least one of the optics comprises aspherical lens elements.

8. The method of claim 4 wherein at least one of the optics comprises hemispherical lens elements.

9. The method of claim 4 wherein at least one of the optics comprises aberration corrected lens elements.

10. The method of claim 4 wherein at least one of the optics comprises doublet lens elements.

11. The method of claim 4 wherein the projector comprises a digital micromirror device (DMD).

12. The method of claim 4 wherein the image scanning assembly is displaced at rate sufficient to display up to 2000 different views at different angular viewpoints to create time varying 3D view sequential imagery.

13. The method of claim 4 further comprising locating a vertical diffuser between the projector and the image scanning assembly.

14. The method of claim 4 further comprising including a parallax barrier to eliminate ghost images.

15. The method of claim 4 wherein the first optic and the second optic are separated by a distance equal to the sum of their focal lengths.

16. The method of claim 4 wherein at least one of the optics comprises a holographic optical element.

17. The method of claim 4 wherein at least one of the optics comprises an active adaptive optics element.

18. A method for 3D display comprising:
projecting view sequential images from a projector;
scanning and displaying the view sequential images via a refractive image scanning assembly having a first group of lenses and a second group of lenses wherein the scanning and displaying comprises:
sending the view sequential images through the first group of lenses wherein refraction occurs which beam steers the view sequential images;
sending the view sequential images through the second group of lenses wherein refraction occurs which further beam steers the view sequential images for display;
periodically and repeatedly displacing at least one group of lenses in regard to the other group of lenses in first and second coplanar directions to refractively scan the view sequential images by beam steering the view sequential images to selected angular viewpoints to create 3D view sequential imagery.

19. The method for 3D display of claim 18 further comprising:

synchronizing and controlling the projector with the image scanning assembly via an image rendering controller to control the projector and to control the image scanning assembly based on positions of the groups of lenses detected from the image scanning assembly.

20. The 3D display apparatus of claim 18 wherein the image rendering electronics controller and the image scanning assembly are electrically connected to the projector and to the image scanning assembly.

21. A method for 3D display comprising:

projecting images from a projector;

scanning and displaying the images via an image scanning assembly wherein the scanning and displaying comprises:

sending the images through a first optic;

sending the images through an intermediary optical assembly;

sending the images through a second optic; and periodically and repeatedly displacing at least one optic in regard to the other optic in first and second coplanar directions in order to scan the images to selected viewpoints to create 3D imagery.

22. The method of claim 21 wherein the intermediary optical assembly comprises a projection lens.

23. The method of claim 21 wherein the intermediary optical assembly comprises a projection lens and at least one Fresnel lens to create a telecentric input into the second optic.

* * * * *